Patented Jan. 20, 1942

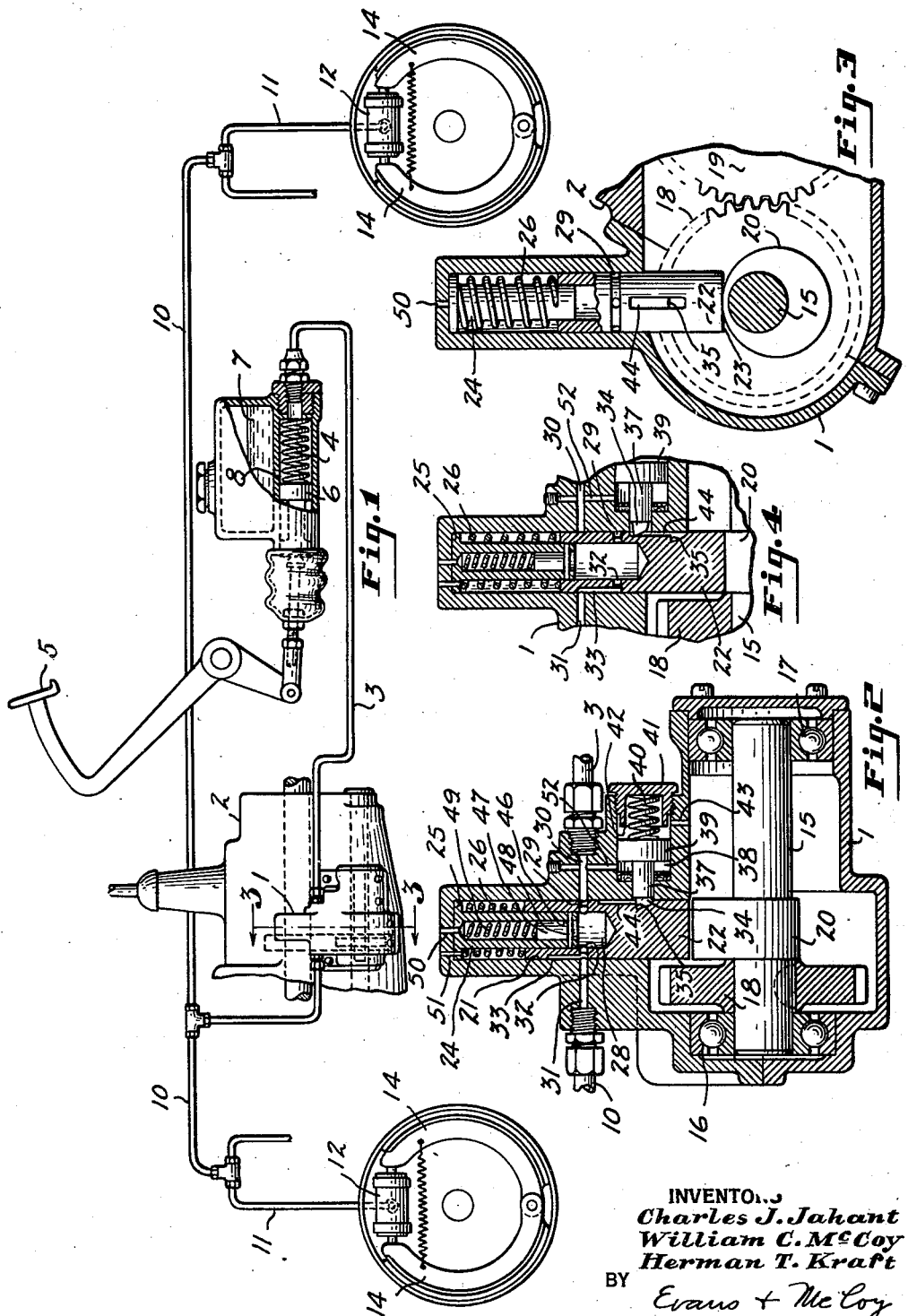

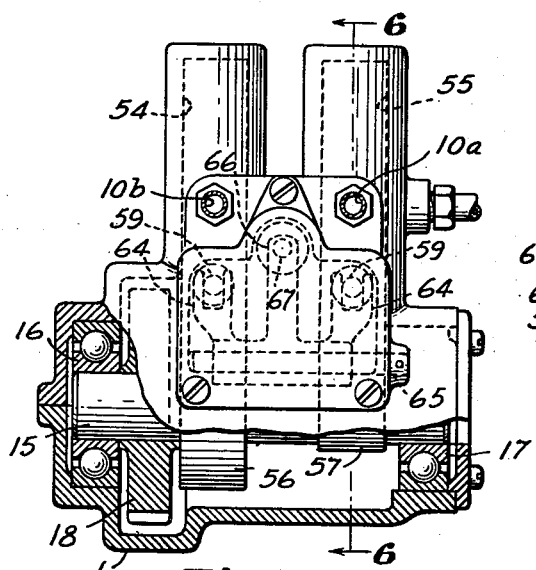
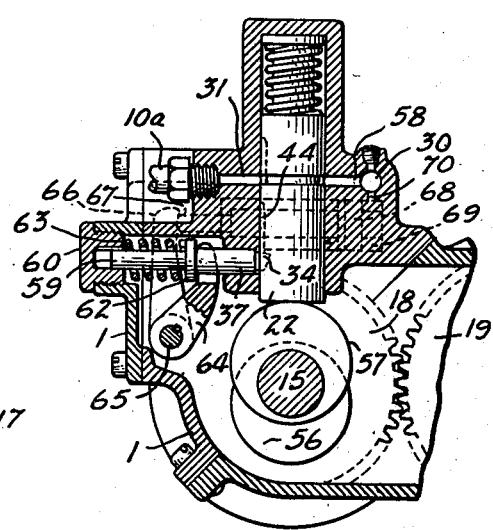
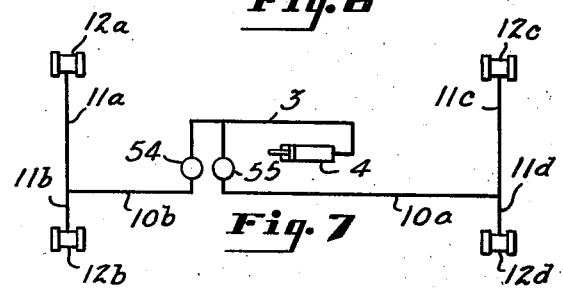
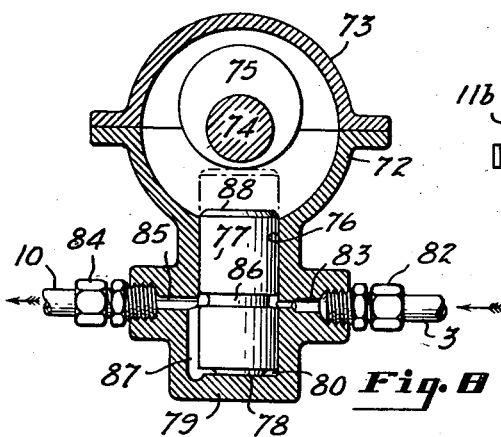
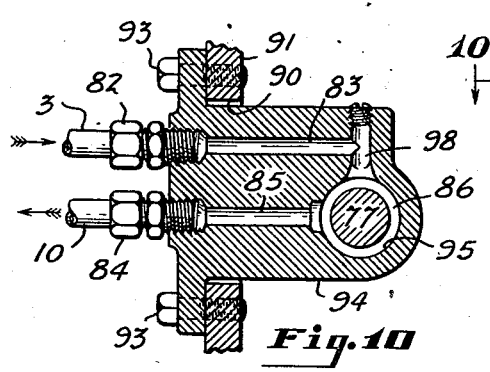

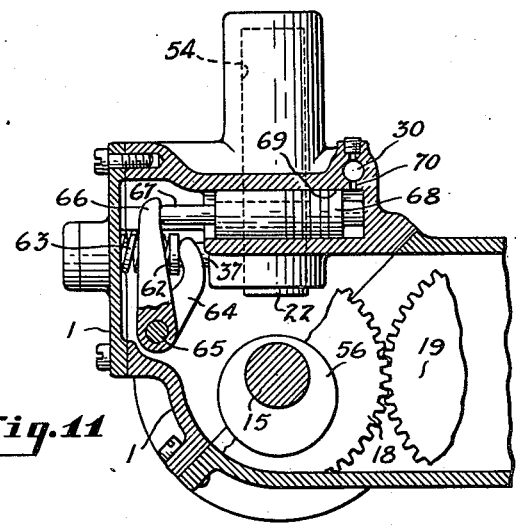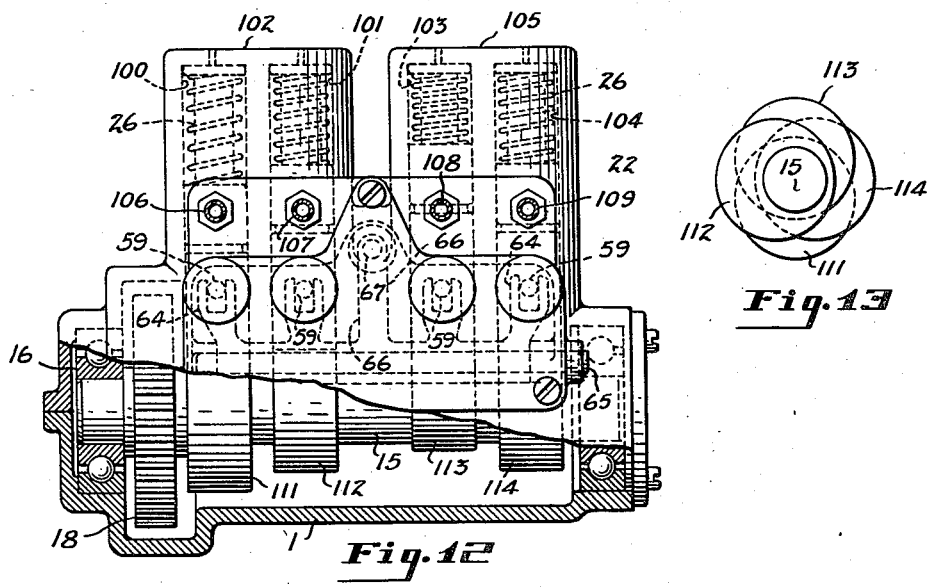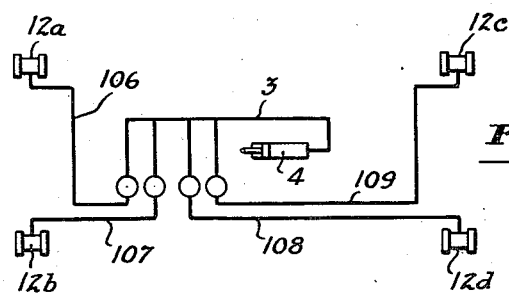

2,270,586

UNITED STATES PATENT OFFICE 2,270,586

VEHICLE BRAKE PULSATOR AND METHOD OF BRAKING

Charles J. Jahant, Akron, William C. McCoy, Shaker Heights, and Herman T. Kraft, Akron, Ohio, assignors to The General Tire & Rubber Company, Akron, Ohio, a corporation of Ohio Application September 17, 1937, Serial No. 164,290

21 Claims. (Cl. 188—152)

This invention relates to brakes and more particularly to a pulsating brake that provides rapidly recurrent brake-diminishing and brake-increasing forces to minimize brake-locking tendencies and obtain more efficient brake applications.

In the past it has been common practice, particularly among professional operators of motor vehicles, to apply the brakes of their vehicles by the recurrent application of pressure to the foot pedal when on slippery roads and the like, as a means of minimizing the locking of the brakes in their applied position with the resultant decrease in the maximum efficiency of the brakes in arresting the momentum of the vehicle and to minimize the tendency to skid.

For quick stops and in emergencies, the release of the brakes cannot be accomplished quickly enough by foot pressure to obtain maximum stopping efficiency from the brakes and it is only by the greatest presence of mind that even experienced operators are able to release and reapply their brakes under emergency conditions to prevent locking of the vehicle wheels and the resulting loss of braking effort.

An object of this invention is to provide mechanical means for intermittently reducing the braking effort produced by the brake pedal in order to prevent more than instantaneous locking of the vehicle wheels and thereby increase the ability of the operator to stop the vehicle with less skidding and in a minimum of time.

With additional objects in view, which will be apparent to those familiar with the art to which the present invention pertains, illustrative embodiments of the invention are disclosed in the accompanying drawings, in which:

Fig. 1 is a diagrammatic representation of a vehicle hydraulic brake system including a pulsation effecting mechanism that embodies the present invention;

Fig. 2 is an elevational section of the brake pulsation unit shown in Fig. 1 and enlarged with respect thereto;

Fig. 3 is an elevational section with parts removed of the brake pulsating unit shown in Figs. 1 and 2; taken substantially on the line 3—3 of Fig. 1;

Fig. 4 is a fragmentary elevational section similar to Fig. 2 showing the pulsating piston in lowered position;

Fig. 5 is an elevational view partly in section and with parts removed of a pulsation unit employing multiple pulsation pistons;

Fig. 6 is a vertical sectional view of the multiple piston pulsating unit taken substantially on the line 6—6 of Fig. 5;

Fig. 7 is a diagrammatic representation of the fluid connections for a brake system employing a multiple piston pulsating unit;

Fig. 8 is a diagrammatic vertical sectional view of a modified form of pulsating unit;

Fig. 9 is a fragmentary vertical sectional view showing a modified form of pulsating unit actuated from the cam shaft of an internal combustion engine;

Fig. 10 is a sectional view taken substantially on the line 10—10 of Fig. 9;

Fig. 11 is a fragmentary sectional view with parts broken away showing the latch releasing mechanism of the device illustrated in Figs. 5 and 6;

Fig. 12 is an elevational view, partly in section and with parts removed, showing a modification of the invention employing four pulsating chambers and pistons and corresponding to Fig. 5;

Fig. 13 is a fragmentary detail showing the relative positions of the actuating cams on the control shaft of the embodiment shown in Fig. 12; and Fig. 14 is a diagrammatic representation of the fluid connections for a brake system employing the multiple piston pulsating unit illustrated in Fig. 12.

The present invention contemplaes a brake-actuating mechanism in which a pulsating unit is interposed between the braking means of the vehicle and the lever or pedal actuated by the driver or operator or subject to his control. Such an arrangement may be applied to brakes of any conventional character and in describing suitable embodiments of the invention the details of brake construction have been omitted, since they may be any of a number of designs well known in the art.

The pulsating unit contemplated is designed to cut off or interrupt the braking force applied by the driver of the vehicle for a series or succession of rapidly recurrent intermittent relatively short time intervals. During the intervals that the brake-actuating force applied by the vehicle operator is cut off the brake-applying force prior to cut-off is gradually diminished and then increased to substantially re-establish the original value prior to cut-off. Accordingly, if the initial brake-applying force is sufficient to lock the wheels and cause skidding thereof, the subsequent diminution of the brake-applying force releases the wheels so that they may rotate and prevent the objectionable skidding which would otherwise interfere with the safe and effective braking of the vehicle.

After each interval of cut-off the pulsator permits the actual braking force applied by the operator of the vehicle to be momentarily transmitted to the brakes.

The embodiments of the invention illustrated in the drawings are for use in connection with hydraulic braking systems. The arrangement of the pulsator is such that after an initial brake application the flow of fluid through the fluid conduit from the pressure cylinder to the individual brakes is automatically arrested, and by means of a suitably actuated liquid pump the brake fluid pressure in the lines communicating with the various brakes is diminished and then increased in a rapidly recurrent succession of pulsations. After completion of each pulsating cycle the high pressure of the fluid conduit is put into communication with the several conduits leading to the various brakes to permit substantial equalization of the fluid in the several courses. Upon release of the brake-applying pressure the intensity of the pulsations diminishes until the brakes are entirely released and the pulsator becomes inactive.

The embodiment of the invention illustrated in Figs. 1 through 4 shows housing 1 of the pulsating device secured to transmission 2 of an automotive vehicle. The pulsating device is connected by fluid conduit 3 to the actuating cylinder or pressure developing chamber 4 of a conventional hydraulic brake system in which foot pedal 5 is arranged through suitable linkage to compress the brake fluid in the actuating cylinder 4 by means of a piston 6. A reservoir 7 is arranged above the cylinder 4 and communicates therewith through a port 8 which is uncovered at each retraction of the piston 6 so that losses of working fluid from the system are automatically replenished.

The pulsating device is connected by main line conduit 10 and branch line conduits 11 to the cylinders 12 which actuate the individual wheel brakes of the vehicle in accordance with the usual hydraulic brake construction.

The pulsator housing 1 encloses a shaft 15 journalled in roller bearing assemblies 16 and 17. This shaft has keyed thereto a gear 18 which meshes with a gear 19 of the vehicle transmission. Preferably the gear 19 is one of the gears connected to the driveshaft and wheels of the automotive vehicle so that it is rotated by the movement of the vehicle. An eccentric 20 is secured or formed on the shaft 15 for rotation in a plane passing longitudinally through a cylinder 21 formed in the housing 1. The pulsating piston 22 is slidably received in the cylinder 21 and has a working face 23 that engages the eccentric 20, as will be later described.

The end of the piston 22 opposite the working face 23 is axially bored to provide a cylinder which receives a ram 24. This ram has an enlarged diameter base 25 which seats against the closed end of the cylinder 21. A helical compression spring 26 is disposed about the ram 24 and seats against the base 25 of the ram and the end of the piston 22 to normally urge the latter into engagement with the eccentric 20. A pulsating chamber 28 is thus defined internally of the piston 22 by the bore and the ram 24. Normally the spring 26 tends to withdraw the ram 24 from the bore to increase the volume of the pulsating chamber 28.

An annular fluid-conducting groove 29 is formed circumferentially about the piston 22 in the region of the chamber 28 and positioned so that when the piston is in its uppermost position and the chamber 28 is of smallest volume, inlet and outlet passageways 30 and 31 respectively, formed in the housing 1, register with the groove 29. Thus, when the piston 22 is in the position illustrated in Fig. 2 and the foot pedal 5 is depressed, fluid pressure developed in the actuating cylinder 4 by the piston 6 is transmitted through the conduit 3 and the fluid flows through the inlet passageway 30 around the annular groove 29 in the piston 22 through the outlet passageway 31 to main line conduit 10, which distributes the high pressure fluid to the various branch line conduits 11 and the individual wheel brake cylinders 12 to actuate the brakes.

The pulsating chamber 28 communicates with the annular groove 29 adjacent the outlet passageway 31 through a passage 32. This passage terminates within the chamber 28 beyond the end of the ram 24 so as not to be obstructed thereby. A longitudinally extending groove 33 is provided on the piston 22 and is continuous with the annular groove 29 and passage 32. It also remains in communication with the outlet passageway 31 throughout the reciprocatory movement of the piston 22 so as to provide a continuous through passageway between the pulsating chamber 28 and outlet passageway 31.

A side latch 34 normally is in engagement with a shoulder 35 formed on the piston 22 to retain the latter in raised position to provide a continuous passageway from the fluid conduit 3 to the main line conduit 10 as described above. Actuating rod 37 of the latch 34 extends into an enlarged diameter cylinder 38 and is secured to a piston 39 slidable in the cylinder 38. The direction of movement of the latch 34 and its related parts is substantially normal to the movement of the pulsating piston 22 and the latch is normally urged into engagement with the shoulder 35 of the piston by a helical compression spring 40. One end of this spring seats against the piston 39 and the opposite end is received in a cup formed in cylinder closing cap 41, the latter also serving to limit the withdrawing movement of the latch 34 from the shoulder 35 by engagement of collar 42 of the cap with the piston 39. A vent 43 extends from a portion of the cylinder 38 adjacent the plugs 41 into the chamber for the shaft 15 to prevent entrapment of air between the piston 39 and cap 41.

In its retracted position illustrated in Fig. 4, the latch 34 is not entirely withdrawn from the cylinder 21 and slides in a groove 44 extending longitudinally in the outer surface of the piston 22. In this manner rotation of the piston 22 in the cylinder 21 is prevented and the groove 33 is maintained in communication with the outlet passageway 31.

The ram 24 has an axial bore 46 which communicates with the pulsating chamber 28 and slidably receives small piston 47 retained by a pin 48. A relatively strong compression spring 49 is received in the bore 46 between the piston 47 and the base 25 to normally urge the piston 47 toward the pin 48 and serve as a shock absorber and safety device for the pulsator. Preferably a vent 50 is formed through the base of the ram and the housing 1; also, a locating pin 51 has a press fit in the housing 1 and base 25 of the ram to prevent rotation or movement of the latter in the cylinder 21.

A fluid passage 52 is formed in the housing 1 and extends between the inlet passageway 31 and latch chamber 38. When the foot pedal 5 is depressed and a high fluid pressure created in the cylinder 4 the fluid is forced through the conduit 3, passageway 30, annular groove 29, outlet passageway 31, and the conduits 10 and 11 to the brake shoe cylinders 12 which apply the brake shoes 14 to the brake drums in the usual manner. Simultaneously, the high pressure fluid is forced through the passage 52 into the latch cylinder 38, to withdraw the latch 34 from the shoulder 35 and release the pulsating piston 22 which moved into engagement with the eccentric 20 under the influence of compression spring 26. The initial movement of the piston 22 seals the inlet passageway 30 to interrupt the flow of high pressure fluid to the pulsator from the pressure-developing chamber. This movement of the piston 22 under the influence of spring 26 also increases the volume of pulsating chamber 28 which withdraws fluid from the brake shoe cylinders 12, thus decreasing the effective braking force. The high pressure fluid in some instances may exert sufficient independent expanding force in the chamber 28 to move the piston 22 without the spring 26.

The eccentric 20, rotating relatively rapidly under the influence of the engine or vehicle or some independent power source, engages the working face 23 of the piston 22 almost immediately after application of the brakes by the pedal 5. After initial contact between the eccentric 20 and the piston 22 the latter substantially rides on the eccentric so long as the braking force is applied by the pedal 5. At each upward movement of the piston 22 under the influence of the eccentric 20 the pulsating chamber 28 is decreased in volume because of the movement thereinto of the ram 24. This action forces the fluid out the passage 32 and into the main line conduit 10 through the longitudinal groove 33 and outlet passageway 31. Thus, at each raising of the piston 22 by the eccentric 20 there is a reapplication of the brakes to substantially the degree initially applied by the foot pedal 5 prior to the cutting off of the high pressure supply of fluid. As soon as the pulsating piston is raised to its initial position the annular groove 29 uncovers the inlet passageway 30 so that an additional charge of high pressure fluid is allowed to pass from the high pressure fluid conduit 3 through the pulsating unit and into the main line conduit 10 and then to the brake cylinders 12 for reapplication of the brakes to a greater degree than before.

Thus, so long as the foot pedal remains depressed there is a series of rapidly recurrent brake applications and brake releases. The intensity of the brake application is at no time greater than that produced by the foot pedal 5, and between each application the intensity decreases so that if the original application tended to lock the brakes and cause skidding of the wheels the subsequent release of the braking action by the flow of the fluid into pulsating chamber 28 releases the brakes sufficiently to prevent locking and a resulting improved braking is produced.

In some instances it is preferable that the brake-applying pulsations for the different wheels of an automotive vehicle be out of phase with respect to one another. A device to accomplish this result is illustrated in Figs. 5 and 6. The construction and operation of this device is similar to that previously described, and like parts have been identified by the same numerals of reference. Some of the parts which are the same as in the previous description have been given new numbers because of duplication and for clearness. The housing 1 is formed with two cylinders 54 and 55 which correspond to the cylinder 21 previously described. The pulsating pistons 22 in each of these cylinders operates in the same manner as that previously described. They are reciprocated by eccentrics 56 and 57 secured on the shaft 15 driven by any suitable means such for example as from the transmission as previously described or by the motor or engine of the vehicle or an auxiliary source. The eccentric 56 is out of phase with respect to eccentric 57 so that the compression of the brake fluid in the pulsating chamber of the piston in the cylinder 54 does not occur at the same time as the compression of the fluid in the pulsating chamber of the piston in cylinder 55. As shown in Fig. 6, the eccentrics are about 180° out of phase, which has been found to be a suitable setting, other amounts being contemplated, however.

In this modification the inlet passageway 30 extends alongside the cylinders 54 and 55 and communicates with each through short passages 58 shown in Fig. 6 for the cylinder 55. The outlet passageways 31 lead from the cylinders 54 and 55 to the main line conduits 10b and 10a respectively.

The actuating rods 37 for both of the latches 34 are disposed in spaced parallel relation and have their ends 59 opposite the latches longitudinally slidable in plugs 60 which threadedly engage the housing 1. These plugs are adjusted so that the end 59 of the actuating rod seats in the bottom of the plug bores to prevent complete retraction of the slide latches 34 from the grooves 44 in the pulsating pistons 22. Collars 62 are formed on the rods 37 and springs 63 are compressed between these collars and the plugs 60 to normally urge the latches to the right, as viewed in Fig. 6 into engagement with the pistons 22.

Retraction of the latches 34 is accomplished by yoke levers 64 which straddle the rods 37 and engage the collars 62 opposite the springs 63. The yoke levers are secured on shaft 65 journalled in the housing 1. Both latch levers may be made integral, as shown, to insure simultaneous release of both pulsating pistons. Extending upwardly between the yoke levers 64 and desirably formed integral therewith is a lever 66, also pivoting on the shaft 65. The end of this lever has a socket which receives the end of rod 67 of latch piston 68 which is slidable in cylinder 69 formed in the housing 1, the cylinder communicating with the inlet passage 30 through short passage 70. The piston 68 functions in a manner similar to the piston 39 described in connection with Fig. 2. Upon the creation of a fluid pressure in the actuating cylinder 4 of a hydraulic brake system in which the unit shown in Figs. 5 and 6 is installed, the high pressure fluid in the inlet passageway 30 flows into the cylinder 69 and moves the piston 68 to the left as viewed in Fig. 6, thus pivoting the levers 64 and 66 in a counterclockwise direction to withdraw the latches 34 from the pulsating pistons 22, permitting the latter to drop to the eccentrics 56 and 57. Since these eccentrics are out of phase one of the pulsating pistons will be rising while the other is falling, and vice versa.

Fig. 7 is a diagrammatic representation of a brake system employing the pulsating device of Figs. 5 and 6, the pulsator of cylinder 54 is connected in series with the right and left front wheel brakes 12a and 12b respectively through main line 10b and branch lines 11a and 11b. The rear brakes 12c and 12d for the right and left rear wheels respectively receive their rapidly recurrent energizations from the pulsating mechanism associated with cylinder 55 through the main line 10a and branch lines 11c and 11d respectively. Thus, while the braking force on the front wheels 12a and 12b is being increased by the compression of the brake fluid in the pulsating chamber 28 associated with the cylinder 54, the braking force applied to the rear wheels 12c and 12d is being diminished by an increase in volume of the pulsating chamber 28 associated with the cylinder 55. In this manner a smooth braking action is applied to the vehicle so that the occupants do not experience a jerking or irregular movement. If desired, it is contemplated to use additional pulsating pistons to provide a pulsating chamber individually for each wheel which may be actuated out of phase with one another similar to the construction set forth in Figs. 5 and 6. The multiple cylinder form of the device is preferred for most installations since it provides a difference in timing of pulsations for the various wheels. If so desired, the pulsation period for the right front and left rear wheels may be the same and different from the pulsation period for the left front and right rear wheels. A suitable multiple cylinder pulsator is illustrated in Fig. 12. This modification of the invention is similar to the embodiment shown in Figs. 5 and 6 except that four pulsating chambers or cylinders are employed in lieu of the two cylinders 54 and 55 previously described. In the four-chamber device cylinders 100 and 101 are formed in side by side parallel relation to one another in an upstanding portion 102 of the housing or casing 1, and cylinders 103 and 104 are similarly formed in an upstanding portion 105 of the casing. The high pressure fluid from the pressure developing chamber 4 is supplied to the cylinders or chambers 100, 101, 103 and 104 similarly to the manner in which such fluid is supplied to the cylinders 54 and 55 previously described. The fluid channels and grooves formed in the pulsating pistons 22 that reciprocate in the cylinders of the device shown in Fig. 12 are connected by passages corresponding to the passages 31, previously described, to individual conduits 106, 107, 108 and 109 that lead to the several brakes 12a, 12b, 12c and 12d previously mentioned. In this manner a separate pulsating cylinder with its associated piston is provided for each of the four brakes of the vehicle. Actuation of the pulsating pistons in the several cylinders is by means of a plurality of cams 111, 112, 113 and 114, secured on the shaft 15 in different rotative positions and which correspond to the cams 56 and 57 previously described. The cams for the several pulsating pistons may be arranged approximately 90° apart, as indicated in Fig. 13, so that the several pulsating pistons of the device shown in Fig. 12 are operated sequentially and out of phase with one another. Such an arrangement promotes a smoother braking action and avoids jerking or shaking of the vehicle.

In the embodiment illustrated in Fig. 8 a housing comprising a cylinder block 72 and cap 73 encloses a portion of a shaft 74 which is rotated by any suitable means such for example as the cam shaft or timing gears of the automotive vehicle engine. This shaft has secured thereon an eccentric 75 which rotates in a plane passing longitudinally through a cylinder 76 formed in the cylinder block 72. A pulsating piston 77 has sliding engagement in the cylinder 76 and has a downwardly directed spacing boss 78 which engages head 79 at the closed end of the cylinder 76 to provide a fluid chamber 80 of small volume when the piston 77 is at its lower limit of movement. The high pressure fluid conduit 3 from the pedal actuated pressure chamber or cylinder is connected by fitting 82 to the cylinder block 72 and communicates with an inlet passageway 83 which terminates at a mid portion of the cylinder 76. In a similar manner the main line conduit 10 is secured to the cylinder block by a fitting 84 which communicates with an outlet passageway 85 terminating in the cylinder 76 opposite the inlet passageway 83. An annular groove 86 is formed circumferentially about the piston 77 so that when the latter is at its lower limit of movement as viewed in Fig. 8 the groove registers with both the inlet passageway 83 and outlet passageway 85 to provide a continuous course for the brake fluid through the cylinder block 72.

A bleeder passage 87 extends longitudinally of the cylinder 76 from the outlet passageway 85 to the fluid chamber 80 in the closed end of the cylinder. Upon pressure being applied to the foot pedal of an automotive vehicle brake system forcing high pressure fluid through the conduit 3 the fluid flows through the inlet passageway 83 around the annular groove 86 of the piston 77 into the outlet passageway 85 and thence through the main line conduit 10 to the brake system. Simultaneously a portion of the high pressure fluid is bypassed from the outlet passageway 85 through the bleeder passageway 87 into the fluid chamber 80. This fluid raises the piston 77 so that the groove 86 moves beyond the port opening of the inlet passageway 83 into the cylinder 76, thus cutting off the flow of high pressure fluid to the brakes. High pressure fluid continues to flow through the bleeder passage 87 into the chamber 80 from the main line conduit 10. This continues until working face 88 of the piston 77 is brought into contact with the eccentric 75 continuously rotated by the shaft 74. The eccentric then forces the piston 77 downwardly into the cylinder 76, compressing the fluid in chamber 80 and forcing it through the bleeder passage 87 back into the main line conduit 10 and to the brake or brakes. As soon as the groove 86 uncovers the port of the inlet passageway 83 (provided fluid is still being supplied under pressure through the conduit 3) another charge of fluid is forced through the annular groove 86 into the main line conduit 10 to reapply the brakes with increased pressure, a portion of this fluid being bypassed through the bleeder passage 87 into the chamber 80 and again elevating the piston 77 to repeat the cycle. The working face 88 of the piston follows the eccentric 75, being maintained thereagainst by the high pressure fluid in the chamber 80. The maximum braking pressure is applied when the annular groove 86 is in communication with the inlet passageway 83 and outlet passageway 85 so that there is a through course for the fluid and the braking pressure is then directly applied by the foot pedal. After the groove 86 moves past the port of the inlet passageway 83 the braking pressure gradually diminishes on account of the flow of the braking fluid into the chamber 80. This diminishing of the braking pressure continues until the piston 77 commences to move into the cylinder under the influence of the eccentric 75. The braking pressure then increases, substantially to that prior to the closing of the inlet passageway 83 by the piston 77. Upon release of the foot pedal the pressure in the conduit 3 is relieved and when the piston 77 is lowered by the eccentric 75, so that the inlet passageway 83 is in communication with the annular groove 86, the high pressure fluid flows backward through the main line conduit 10 of the braking system to the pedal-controlled actuating cylinder or pressure chamber.

In Figs. 9 and 10 is illustrated a modification of the pulsator similar to that described in connection with Fig. 8. Accordingly, like parts have been indicated by the same numerals of reference. This pulsator is designed for insertion through an aperture 90 formed in the side wall of the internal combustion engine of the motor vehicle. The device includes a capping plate 92 which overlies marginal portions of the engine block around the aperture 90 and is secured thereto by studs 93. An extended body 94 is formed integral with the cap member 92 and supported cantilever fashion thereby internally of the engine. This body portion is bored to provide a vertically extending cylinder 95 which corresponds to the cylinder 76 described in connection with Fig. 8. The location of the body 94 of the device is such that the cylinder 95 is disposed beneath an eccentric 96 carried by cam shaft 97 of the engine. The inlet passageway 83 and the outlet passageway 85 are arranged in parallel relation to one another, the former communicating with the cylinder 95 through an angularly disposed drill hole 98.

The operation of this modification is essentially like that of the device shown in Fig. 8. In both cases the pulsating piston 77 normally rests by gravity on the closed end 79 of the cylinder so that it is out of engagement with its actuating eccentric except when the brakes are applied. A number of the units such as those shown in Figs. 8 through 10 may be utilized in a single vehicle. If desired, one may be supplied for each wheel.

The invention has been described as applied to brake systems in which the primary pressure load on the brake fluid is effected by means of a pedal 5 actuated by the vehicle operator. However, various well known devices, such as hand levers and the like, can be employed, but are not illustrated, since the specific means is not the subject of the present invention. Essentially, the present brake system uses, to create a primary pressure in the brake fluid, a means actuated by the vehicle operator, and therefore termed a "manual means," whether actually operated by foot or hand, in distinction to mechanically operated means such as the pulsating piston 22. Thus, the manual means initiates the braking action and the pulsations are produced mechanically after the pulsating means is released by the latch means 34 in response to the primary manually applied fluid pressure.

Other modes of applying and utilizing the principles of the invention, including alterations in both the method and apparatus, may be employed, change being made as regards the details described, it being understood that the particular forms shown and described and the procedure set forth are presented for purposes of explanation and illustration.

What we claim is:

1. The method of retarding the velocity of a vehicle having pedal-actuated friction brakes which comprises applying a primary load to the brakes through the pedal, automatically rendering the pedal ineffective to energize the brakes for a series of rapidly recurrent, relatively short-time intervals, alternating with time intervals during which the braking force is determined by the pedal pressure and a succession of primary loads is established, and automatically varying the braking load during the time intervals that the pedal is ineffective to produce a succession of secondary loads.

2. The method of retarding the velocity of a vehicle having pedal-actuated friction brakes which comprises applying a primary load to the brakes through the pedal, automatically rendering the pedal ineffective to energize the brakes for a series of rapidly recurrent, relatively short-time intervals, alternating with time intervals during which the braking force is determined by the pedal pressure and a succession of primary loads is established, and automatically varying the braking load during the time intervals that the pedal is ineffective to produce a succession of secondary loads, each secondary load being of less amount than the preceding primary load.

3. The method of operating hydraulic vehicle brakes having a pressure-developing cylinder arranged to be energized by the vehicle operator and brake-actuating cylinders connected to the pressure-developing cylinder by a hydraulic system which comprises creating a fluid pressure in the pressure-developing cylinder to apply the brakes under a primary load, automatically closing the hydraulic connection between the actuating cylinders and pressure-developing cylinder, and automatically creating a series of rapid pressure pulsations in the portion of the hydraulic system between the closure region and the actuating cylinders.

4. The method of operating hydraulic vehicle brakes having a pressure-developing cylinder arranged to be energized by the vehicle operator and brake-actuating cylinders connected to the pressure-developing cylinder by a hydraulic system which comprises creating a fluid pressure in the pressure-developing cylinder to apply the brakes under a primary load, automatically closing the hydraulic connection between the actuating cylinders and pressure-developing cylinder, automatically lowering the fluid pressure in the portion of the system remaining in fluid communication with the actuating cylinders to reduce the primary load by a predetermined amount and establish a secondary load, automatically raising the fluid pressure in said portion of the system to increase the braking load and substantially re-establish the primary load, and automatically opening the communication between the actuating cylinders and the pressure-developing cylinder to permit equalization of fluid pressures in the system and regulation of the primary braking load to accord with that produced in the pressure developing cylinder.

5. In a vehicle hydraulic brake mechanism having a conduit for carrying high pressure fluid from a pressure chamber to energize the brakes the combination of a pulsator interposed in the conduit, said pulsator including a piston disposed in the path of fluid through the pulsator and movable to substantially arrest the flow of fluid, and means for reciprocating the piston upon an increase in fluid pressure in the conduit.

6. In a vehicle hydraulic brake mechanism having a conduit for carrying high pressure fluid from a pressure chamber to energize the brakes the combination of a pulsator interposed in the conduit, said pulsator including a chamber communicating with the conduit, and automatic means for alternately increasing and decreasing the size of the pulsator chamber to produce a series of pressure pulsations of relatively small magnitude in the conduit, said automatic means being arranged to substantially arrest the flow of fluid into the pulsator chamber from the pressure chamber in timed relation with the pulsations.

7. In a vehicle hydraulic brake mechanism having a conduit for carrying high pressure fluid from a pressure chamber to energize the brakes the combination of a pulsator interposed in the conduit, said pulsator including a chamber communicating with the conduit, movable means in the pulsator chamber for alternately increasing and decreasing the volume thereof to produce a series of pulsations of relatively small magnitude in the conduit, and the movable means arranged to substantially arrest the flow of fluid into the pulsator chamber from the pressure chamber while the pulsator chamber is at its greatest volume.

8. In a brake system, means for manually applying a primary load to a brake, means movable upon the application of said load to arrest the manual application and automatically reduce the load previously applied manually, and then automatically increase the reduced load, and means for actuating the movable means.

9. In a brake system, means for manually applying a primary load to a brake, means movable upon the application of said load to interrupt the manual load application during a series of discontinuous time intervals, and during each of said intervals to automatically reduce the load previously applied manually, and then increase the reduced load to produce a series of recurrent brake pulsations, and means for actuating the movable means.

10. In a hydralic brake system employing a brake fluid, manually operated means for compressing the fluid, a housing, a chamber in the housing for receiving compressed fluid from said manually operated means, a passageway in the housing through which fluid from the compressing means flows to the chamber, means in the chamber for alternately decreasing and increasing the pressure on the fluid, said last named means arranged to substantially arrest the flow of fluid through said passageway during said decreasing and increasing of the fluid pressure in the chamber, and means for actuating the pressure decreasing and increasing means independently of the manual means.

11. In a hydraulic brake system, a brake responsive to hydraulic pressure, manual means for applying a primary pressure load to a brake fluid, a chamber to receive high pressure fluid from said manual means and deliver high pressure fluid to the brake, reciprocable means for creating a rapidly recurrent series of alternating pressure decreases and pressure increases in the chamber, said reciprocable means being arranged to permit the relatively free flow of fluid from the manual means to the brake while in normal position, and while in another position, to substantially arrest the flow of high pressure fluid from the manual means to the brake, means engageable with the reciprocable means for actuating the latter to produce said pressure alternations, and means for holding the reciprocable means out of engagement with the actuating means and in said normal position, said holding means being responsive to the manual means to release the reciprocable means for reciprocation thereof by the actuating means upon the application of a primary pressure to the brake fluid by the manual means, and to permit the reciprocable means to move to said second named position.

12. Apparatus for retarding the velocity of a moving body, comprising a brake responsive to fluid pressure, a pulsating chamber for fluid having substantially continuous fluid connection with the brake, a manually controlled source of fluid under pressure, means effecting fluid connection between the source and chamber, means for interrupting said last named connection during a series of rapidly recurrent intermittent time intervals, and means for decreasing and increasing the chamber volume during said time intervals to subject the brake to a series of rapidly recurrent pressure increases and decreases.

13. Apparatus for retarding the velocity of a moving body, comprising a plurality of brakes responsive to fluid pressure, a pulsating chamber for fluid having substantially continuous fluid connection with one of the brakes, another pulsating chamber having substantially continuous fluid connection with another brake, a manually controlled source of fluid under pressure, means effecting fluid connection between the source and each of the chambers, means for interrupting the connection between the source and the first named chamber during a series of rapidly recurrent intermittnt time intervals, means for interrupting the connection between the source and the second-named chamber during a second series of rapidly recurrent intermittent time intervals noncoincident with said first named series of time intervals, and means for decreasing and increasing the volume of each chamber during each of said time intervals of the series associated therewith to simultaneously subject the several brakes to noncoincident pressure pulsations.

14. In a brake system for a vehicle, a fluid responsive brake, means operable by the vehicle operator for supplying fluid under pressure to the brake, a conduit for fluid connecting the fluid supply means to the brake, means including a piston and pulsating chamber interposed in the conduit for controlling the fluid pressure applied to the brake, said controlling means being formed to provide a relatively unobstructed passage for fluid moving through the conduit in one position of the piston and to provide a substantially fluid-tight closure for the conduit in another position of the piston, and means for reciprocating the piston between said positions to alternately open and close the fluid passage through the control means and thereby subject the brake to fluid pressure supplied by the operator during a series of discontinuous time intervals which alternate with time intervals during which the fluid connection between the supply means and the brake is disestablished.

15. In a brake system for a vehicle, a fluid responsive brake, means operable by the vehicle operator for supplying fluid under pressure to the brake, a conduit for fluid connecting the fluid supply means to the brake, means including a piston and pulsating chamber interposed in the conduit for controlling the fluid pressure applied to the brake, said controlling means being formed to provide a relatively unobstructed passage for fluid moving through the conduit in one position of the piston and to provide a substantially fluid-tight closure for the conduit in another position of the piston, means for holding the piston in said one position, means responsive to an increase in fluid pressure in the conduit to actuate the holding means to release the piston, and means for reciprocating the piston between said positions to alternately open and close the fluid passage through the control means and thereby subject the brake to fluid pressure supplied by the operator during a series of discontinuous time intervals which alternate with time intervals during which the fluid connection between the supply means and the brake is disestablished.

16. The method of controlling the retarding of a wheeled vehicle having brakes to which variable pressure can be applied to actuate the same, which comprises interrupting applied pressure during a series of discontinuous time intervals, and lowering the applied pressure a substantially constant amount during each interval to establish a discontinuous series of intermediate pressures each of which is less than and proportioned to the preceding applied pressure.

17. The method of controlling the retarding of a wheeled vehicle having brakes to which variable pressure can be applied to actuate the same, which comprises interrupting the applied pressure for a relatively short time interval and while the pressure is interrupted, decreasing the pressure to an amount proportional to the applied pressure, and then increasing the pressure to an amount substantially equal to the applied pressure, the interrupting being repeated rapidly to provide a series of pressure pulsations the maximum of each being the applied pressure.

18. The method of retarding the velocity of a moving body which comprises applying to the body a discontinuous series of frictional loads of different amounts, and during the intervals between successive loads only decreasing the loads sufficiently to establish intermediate loads of different amounts which are proportional to the preceding applied loads.

19. The method of retarding the velocity of a vehicle having supporting wheels equipped with friction brakes, which comprises manually applying a load to the brakes and mechanically decreasing and increasing the load by relatively small amounts materially less than the manual load in rapidly recurrent alternations and in response to said manual load application, the energizing of each of said mechanical load increases being independent of the continued application of the manual load, and the mechanical increasing and decreasing of the load being continued substantially throughout the period of manual application of the load.

20. The method of operating a hydraulic brake system which comprises applying pressure on the brake fluid to provide a primary braking force on the brake, interrupting the hydraulic connection between the brake and the point of pressure application during each of a series of rapidly recurrent time intervals, and separately pulsating the pressure on the fluid during the intervals.

21. The method of operating a hydraulic brake system which comprises applying pressure on the brake fluid to provide a primary braking force on the brake, interrupting the hydraulic connection between the brake and the point of pressure application during each of a series of rapidly recurrent time intervals, and mechanically lowering and then raising the pressure on the fluid over a predetermined relatively small pressure range during the intervals to effect a pulsation of the pressure on the fluid.

CHARLES J. JAHANT.
WILLIAM C. McCOY.
HERMAN T. KRAFT.